United States Patent [19]
Asmussen et al.

[11] 3,946,163
[45] Mar. 23, 1976

[54] PORT MULTIPLEXER FOR TELEPHONE SIGNAL PROCESSING SYSTEMS

[75] Inventors: Daniel Richard Asmussen, Kirkland; Barry Cameron Breen, Redmond, both of Wash.

[73] Assignee: Tel-Tone Corporation, Kirkland, Wash.

[22] Filed: Mar. 17, 1975

[21] Appl. No.: 559,032

[52] U.S. Cl. .............................. 179/18 J; 179/15 AT
[51] Int. Cl.² ..................... H04M 3/22; H04Q 11/04
[58] Field of Search ............ 179/15 AT, 18 J, 18 G, 179/15 AL, 18 AB, 18 H, 18 ES, 18 EA, 18 AF, 15 AQ, 18 AD

[56] References Cited
UNITED STATES PATENTS

| | | | |
|---|---|---|---|
| 3,492,430 | 1/1970 | Vigliante | 179/18 AD |
| 3,691,310 | 9/1972 | Fenton | 179/18 AB |
| 3,697,700 | 10/1972 | Greason et al. | 179/18 AB |
| 3,718,769 | 2/1973 | Jacob | 179/18 J |
| 3,821,484 | 6/1974 | Sternung et al. | 179/18 J |

*Primary Examiner*—Thomas A. Robinson
*Attorney, Agent, or Firm*—Christensen, O'Connor, Garrison & Havelka

[57] ABSTRACT

A link is connected between each linefinder/first selector combination of a telephone system. The links, in turn, are selectively connected to a group of ports, several links to one port, and the ports are connected to one or more telephone signal processors. When a telephone goes OFF HOOK, the sleeve or C lead of the linefinder at which that telephone's scanning switch is then pointing (determined by the associated link being connected to an available port) is grounded. When the address of this link next occurs in a time multiplex cycle, the link is latched, and the telephone's tip and ring leads are connected to the link's port. After signal processing has ended, or some other release action occurs, the port generates a release signal that disconnects the link from the port. While any link is connected to its associated port, a make-busy ground circuit forming part of each link applies a false busy signal to the linefinders associated with the other links common to the same port. The false busy signals prevent the linefinders associated with the other links from attempting to seize the busy port via those links. Termination of a conversation flowing through one link creates a WINK signal that causes a release of its associated linefinder, even though another link may be connected to the associated port at the time the conversation is terminated. In the case where two links associated with the same port attempt to seize that port at substantially the same time, the link having the earlier address in the time multiplex cycle actually seizes the port. The second link, upon sensing the creation of a false busy signal (causes by the seizing of the port by the first link) is dumped. Dumping the second link causes the dumped link's linefinder scanning switch to route the second call to a linefinder having a link whose associated port is available for signal processing.

14 Claims, 8 Drawing Figures

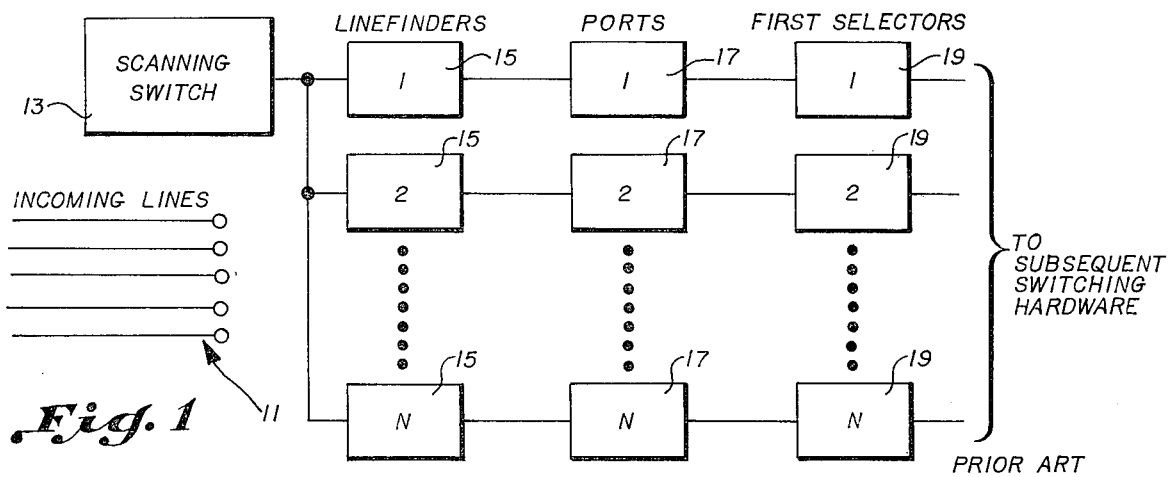
Fig. 1 — PRIOR ART
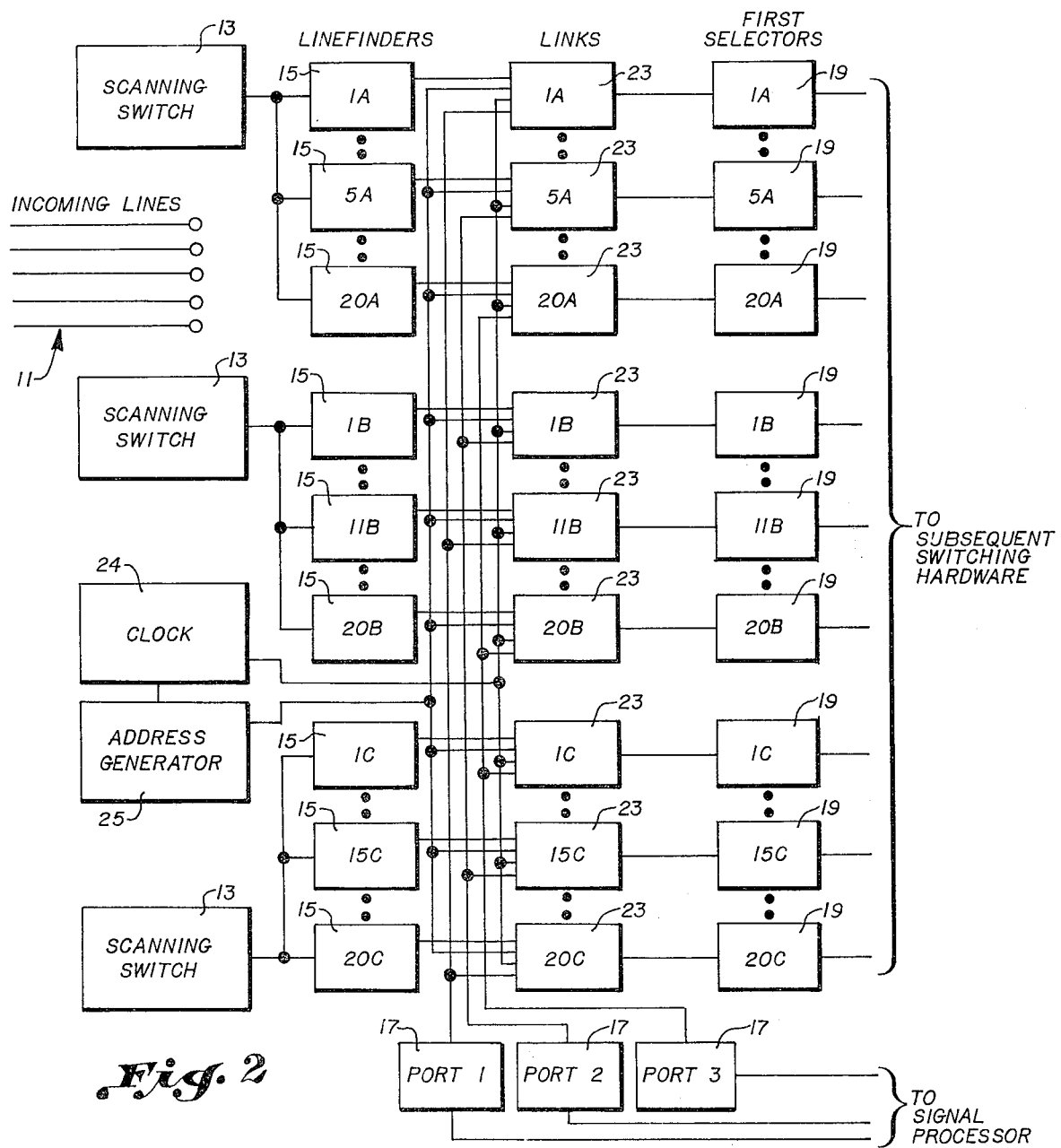
Fig. 2

PORT MULTIPLEXER FOR TELEPHONE SIGNAL PROCESSING SYSTEMS

BACKGROUND OF THE INVENTION

This invention is directed to telephone systems and, more particularly, to telephone signal processing systems, such as tone-to-pulse converters, for example.

In many telephone systems, it is necessary to perform signal processing for one reason or another. One of the most common forms of signal processing presently in use is the conversion of DTMF signals generated by touch tone telephones into rotary dial-type pulses suitable for use by "downstream" switching systems. Such conversion is often necessary because many downstream switching systems are not operable by DTMF signals directly. The telephone signal processor, or in this case, tone-to-pulse converter, may be allotted to a plurality of telephone lines. In such a case, the circuit providing access to the telephone lines is usually referred to as a port. Each port includes an array of electronic circuitry adapted to route signals, in this case DTMF signals, from associated linefinders to the tone-to-pulse converter, and from the tone-to-pulse converter to associated first selectors. The port may, in this context, be either dedicated to a specific signal converter, or be constructed to operate in conjunction with a pool of converters via some type of allotter switch.

In the past, the ports have been dedicated to associated linefinders and first selectors on a one-to-one basis. However, this arrangement has been more expensive than desirable because in many instances port use is only required for a small portion of the time that a particular telephone line is seized. For example, if tone-to-pulse signal processing is required, port usage only occurs during the dialing interval, not during the conversation interval of a total line seizure interval. Thus, in the past, ports have been idle for extended periods of time. Obviously, idle equipment is not cost effective, i.e., it is not cost effective on a cost-per-use basis. In the case of ports, idleness is particularly undesirable because ports are relatively expensive electronic circuits.

Therefore it is an object of this invention to provide an apparatus for reducing the number of ports needed in a telephone signal processing system, such as a tone-to-pulse conversion system.

It is a further object of this invention to provide a port multiplexer suitable for utilizing ports in a more efficient manner.

It is a still further object of this invention to provide an apparatus for use in a telephone signal processing system that reduces the idle time of the ports forming a portion of such a system.

SUMMARY OF THE INVENTION

In accordance with principles of this invention a port multiplexer for a telephone signal processing system is provided. The port multiplexer includes a plurality of time shared links, one adapted for connection between each linefinder and its associated first selector of the telephone system to which the telephone signal processor is to be connected. Groups of links are connected to common ports, whereby the number of required ports is substantially less than the number of required links.

In a conventional manner, the linefinders are scanned by scanning switches. When a scanning switch finds a linefinder connected to a link with an available port, it stops. Thereafter, when a telephone related so that linefinder goes OFF HOOK, the linefinder's sleeve or C lead is grounded. (As will be understood by those skilled in the telephone art, the terms "sleeve lead" and "C lead" are generally used to define connections or wires performing the same function—carrying busy status information between linefinders and first selectors.) If the available port is "seized" by another linefinder connected to it prior to the denoted telephone going OFF HOOK, the telephone's scanning switch stops "pointing" and scans for another link with an available port. When such a link is found, scanning again stops. Thus, the denoted telephone is immediately connected to an available port, if any port to which its links are connected is available when the telephone goes OFF HOOK.

When a telephone's going OFF HOOK causes a sleeve lead ground to occur, the associated link is temporarily seized, and it attempts to seize the port to which it is connected. Seizure, if it is to occur, occurs the next time the link's address turns up in the link time multiplex cycle. Normally seizure does occur, and when it does, a latch forming part of the link is set. The latch maintains port seizure until it is reset. When port seizure occurs, the OFF HOOK telephone's tip and ring leads are split and connected to the available port, and thence, to the telephone signal processor.

At the same time that port seizure occurs, a false busy signal (ground) is applied to the sleeve leads of all of the other links associated with the seized port. Thus, if any of the scanning switches associated with the linefinders of one of those other links is pointing at any of them when the port is seized, those scanning switches immediately scan (look) for another link with an available port.

After the link connection between the port and the subscriber's tip and ring leads is made, signal processing occurs. (As used herein, signal processing covers a variety of electronic functions that can be performed on telephone signals. One of the most common signal processing functions is tone-to-pulse conversion. However, the invention is equally suitable for use with other types of telephone signal processing systems—for example, computer-type signal processing systems adapted to process signals in various manners.) At the end of signal processing, a release signal is generated by the port. The release signal resets the latch of the link that seized the port. Resetting the latch disconnects the link from the port, and terminates the false busy signal. Thereafter, the port becomes available for seizure by the other links to which it is connected.

In accordance with other principles of this invention, when a port is seized by one of its links, it generates a $\overline{\text{P AVAIL}}$ signal. The $\overline{\text{P AVAIL}}$ signal is applied to all links connected to the seized port and causes each link to activate a make-busy ground circuit. The make-busy ground circuits apply a false ground to the sleeve or C leads connected to their associated links and, thus, to all linefinders associated with a seized port. The false grounds form the false busy signals, and prevent other linefinders from attempting to seize the seized port via the other links.

In accordance with further principles of this invention, when a telephone conversation terminates, a wink circuit forming a portion of the link carrying the conversation causes any false ground generated by the make-busy ground circuit of that link to be interrupted for a short (wink) interval. The wink interval enables the linefinder to release the subscriber's or customer's line. After the wink interval, the false ground created by the make-busy ground circuit is returned to insure that the scanning switch ignores the wink creating link because it is not available for service until the $\overline{P\,AVAIL}$ signal is removed following release of the port.

In accordance with still further principles of this invention, an attempt by two links to seize their common port at substantially the same period of time results in the link whose address occurs first in the link multiplex cycle actually seizing the port. As noted above the other link is requested to generate a false ground when seizure occurs, by the $\overline{P\,AVAIL}$ signal. This $\overline{P\,AVAIL}$ signal in combination with link seizure causes tip and ring line splitting to occur, but not port connection. Such line splitting without port connection releases the first selector and associated linefinder of the non-seizing link. Release of these items causes the related linefinder scanning switch to scan for another link having an available port. Once the scanning switch has moved on, the false ground is applied, as in the normal situation.

It will be appreciated from the foregoing brief summary that the invention comprises an apparatus for multiplexing at least one port to a plurality of links. Preferably, a plurality of ports are multiplexed to a plurality of links with the number of ports being substantially less than the number of links. Thus, the idle time of the ports is greatly reduced when compared to prior art systems wherein a port is dedicated to each linefinder/first selector combination of a telephone system. Because the number of ports required is substantially reduced, the cost per port use is also substantially reduced. Preferably, the connections between multiple links and multiple ports is chosen in accordance with a traffic analysis so that all ports are connected to both high and low traffic linefinders, rather than some being connected to only high (and others to low) traffic linefinders. Such a choice of connections obviously will result in averaging traffic over all of the ports whereby, statistically, a port will be available to any telephone whenever it is needed.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a simplified block diagram illustrating a prior art arrangement wherein a port is dedicated to each linefinder/first selector combination;

FIG. 2 is a simplified block diagram of the port multiplexer of the invention;

DESCRIPTION OF THE PREFERRED EMBODIMENT

Figure 3:
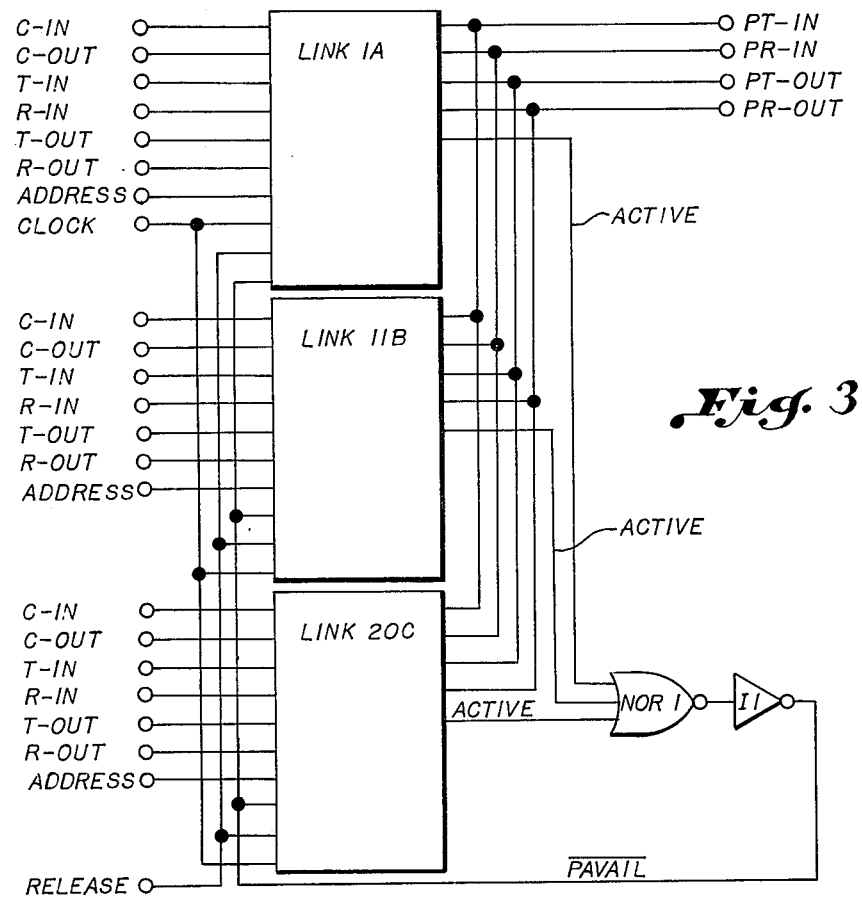
FIG. 3 is a block diagram illustrating three links adapted to connect three linefinders and first selectors to a common port.

FIG. 1 is a block diagram generally illustrating a prior art telephone system that includes provision for access to the system's telephone lines in order for signal processing of telephone signals to be performed. The incoming lines 11 of a plurality of telephones are connected to linefinders 15 (1,2—N) in a conventional manner. A scanning switch 13 is also connected to the linefinders 15. The output of each linefinder 15 is connected to a port 17 (1,2—N) and the output of each port is connected to a first selector 19 (1,2—N). Thus, N linefinders, N ports and N first selectors are included in the total system, and related on a one-to-one basis. The outputs of the first selectors are connected to subsequent switching hardware (not shown).

In a conventional manner, the scanning switch 13 scans the linefinders until it finds one with an available port 17. It then stops scanning and "points" to that linefinder. The next telephone of the plurality of telephones to go OFF HOOK is connected via that linefinder to its first selector 19 via the associated port 17. When the associated first selector receives loop current across associated tip and ring leads, indicating that a connection is being sought, it returns a ground to the linefinder 15 via the port 17 to complete the attachment sequence. Thereafter, the signals generated by the OFF HOOK telephone are applied to the "seized" port 17 via the associated linefinder 15. The port diverts these signals to a signal processor. The signal processor may, for example, be a dedicated signal processor (such as a dedicated tone-to-pulse converter) or an allotted signal processor (i.e., one common to all of the ports, or a plurality thereof). In any event, the signal processing circuitry recognizes whether or not signal processing is necessary. If so, the port is instructed to split the line (if necessary) and signal processing takes place. Processed output signals are applied by the "seized" port 17 to the associated first selector 19. By way of example, if the OFF HOOK telephone is a DTMF telephone, the port will divert the first DTMF signal to the signal processor. Assuming that the signal processor is adapted to convert DTMF signals into pulse signals, it will cause the port to split the line, perform necessary tone validity tests and then outpulse rotary dial-type telephone pulses. These pulses are then applied by the same port to its associated first selector 19.

It will be appreciated from viewing FIG. 1 that, in the past, a port has been required between each linefinder and each first selector. This requirement has led to an undesirable level of cost-per-use because ports are relatively sophisticated, and, therefore, relatively expensive electronic circuits that often include DTMF receivers, modulators, buffers, gating circuits, etc. In many cases, such as tone-to-pulse conversion, their use is only required during a short period of the total time that a particular linefinder/first selector combination is seized by a telephone. More specifically, in a tone-to-pulse conversion situation, a port is only needed during dialing. It is not needed during voice communication. Hence, it is desirable to reduce the total number of ports utilized in an overall telephone system. The present invention is directed to accomplishing this result.

FIG. 2 is a block diagram of a port multiplexer formed in accordance with the present invention and comprises: one or more scanning switches 13; a group of linefinders 15 associated with each scanning switch; a group of links 23 connected to each group of linefinders; a group of first selectors 19 connected to each group of links; a plurality of ports 17; a clock 24; and an address generator 25. It is pointed out here that FIG. 2 is a simplified block diagram of a port multiplexer formed in accordance with the invention. In this regard, only three scanning switches 13 are illustrated, one connected to each group of three groups of linefinders (1aA–20A, 1B–20B and 1C–20C). However, it will be appreciated that additional numbers of scanning switches and groups of linefinders may be included in an actual embodiment of the invention. Similarly, additional groups of links and first selectors may be included in an actual embodiment of the invention.

The groups of linefinders are connected through associated groups of links (1A–20A, 1B–20B and 1C–20C) to associated groups of first selectors (1A–20A, 1B–20B and 1C–20C), all on a one-to-one basis. Thus, each linefinder is connected through a link to a first selector. The links are formed in accordance with the invention and hereinafter described, whereas the linefinders and first selectors are conventional prior art devices, and thus, not described herein.

The links 23 are selectively connected to the ports 17. For purposes of discussion, only three links of each group of links are illustrated in FIG. 2. Moreover, only three ports are illustrated for purposes of clarity and simplicity. It is pointed out, however, that each port could be connected to more links and more ports could be included, if desired, depending upon the telephone traffic carried by the telephone lines 11. For example, in one actual embodiment of the invention each link "group" includes, as illustrated, twenty linefiner/first selector combinations, and six links, spread among the various link groups, are connected to each port. In the simplified illustrated embodiment of the invention, links 1A, 11B and 20C are connected to the first port (PORT 1); links 5A, 1B and 15C are connected to the second port (PORT 2); and links 20A, 20B and 1C are connected to the third port (PORT 3).

It will be appreciated from viewing FIGS. 1 and 2 and the foregoing description, that the number of ports included in the port multiplexer of the invention is substantially less than the number of ports utilized in prior art systems.

The clock 24 and the address generator 25 are connected to all of the links. The simultaneous occurrence of a clock pulse and the address of a link allows the addressed link to take the action hereinafter described. It should be noted that the clock and address generator could form part of a signal processor, or at least their functions could be performed by a suitable signal processor. In any event, the address generator is preferably "hard wired" to each link. In one form, the address generator may take the form of a counter and a decoder for decoding the count state of the counter, each count state defining the address of a particular link.

In operation, rather than the scanning switches 13 looking for a linefinder having an available port, as has been done in the past, the scanning switches look for linefinders connected to links with available ports. As will be better understood from the following description, any time a scanning switch is pointing at a linefinder connected to a link with an available port, and that port is seized by another linefinder connected to the same port via another link, the scanning switch associated with the first linefinder scans for another linefinder connected to a link with an available port. Because the ports are common to a plurality of links, obviously, their idle time is greatly reduced over the idle time of ports utilized in the manner illustrated in FIG. 1 and heretofore described. By analyzing the amount of telephone traffic on the incoming lines 11, and connecting them to links and ports in a statistical manner, the total traffic load can be spread over the ports in a manner such that, statistically, a port will always be available to any telephone immediately after it goes OFF HOOK.

FIG. 3 is a block diagram of three links common to a single port. Links 1A, 11B and 20C, common to PORT 1, are illustrated in FIG. 3. Each link includes a pair of sleeve or C lead terminals designated C-IN and C-OUT. These terminals are connected for the C or sleeve leads commonly associated with linefinders and first selectors. C-IN is connected to the associated first selector and C-OUT is connected to the associated linefinder. In addition, each link includes terminals designated T-IN, R-IN, T-OUT and R-OUT terminals. The T and R refer, as is common in the telephone art, to the tip and ring leads. T-IN and R-IN are connected to the tip and ring terminals of the associated linefinder and T-OUT and R-OUT are connected to the tip and ring terminals of the associated first selector. Also, each link includes an address terminal designated ADDRESS connected to a suitable address generator, as described above, that scans all links in a sequential manner during a time multiplex cycle of operation. Further, all of the links are connected to: a clock terminal designated CLOCK; and, a release terminal designated RELEASE. CLOCK is connected to a suitable clock source, also as discussed above, and RELEASE is connected to the associated port so as to receive a release signal therefrom when signal processing is complete.

All of the links are also connected to four terminals designated PT-IN, PR-IN, PT-OUT and PR-OUT, which are connected to the associated port, in this case PORT 1. PT-IN and PR-IN stand for port tip and ring input terminals. PT-OUT and PR-OUT stand for port tip and ring output terminals. In addition, in the manner hereinafter described each link is adapted to generate an output signal designated ACTIVE. All ACTIVE outputs are connected to the inputs of a NOR gate designated NOR 1, having the number of its inputs equal to the number of links, in the illustrated case, three. The output of NOR 1 is inverted by an inverter designated I1. The output of I1 is designated $\overline{P\ AVAIL}$ and stands for the complement of port available (P AVAIL). The $\overline{P\ AVAIL}$ output of NOR 1 is connected to each link to cause the actions hereinafter described, when one of the links seizes their common port.

In operation, when an address pulse and a clock pulse simultaneously occur, the addressed link is activated, in the manner hereinafter described, to perform certain functions, if it has been previously conditioned to perform those functions by an associated telephone going OFF HOOK. When any of the illustrated links is activated by these conditions occurring, it creates an active signal, i.e., its ACTIVE output achieves a binary one state. This active signal causes the output of I1, $\overline{P\ AVAIL}$, to achieve a binary one state and force all of the other links to apply a false busy (ground) signal to their C-OUT terminal. This false busy signal informs their associated linefinders that the port to which they are connected is busy, and thus, not available. This action, as previously described, causes the scanning switch associated with these other linefinders to scan for other linefinder with a link connected to an available port, if they were pointing at one of the illustrated links when the false busy signal was initiated.

Figure 4:
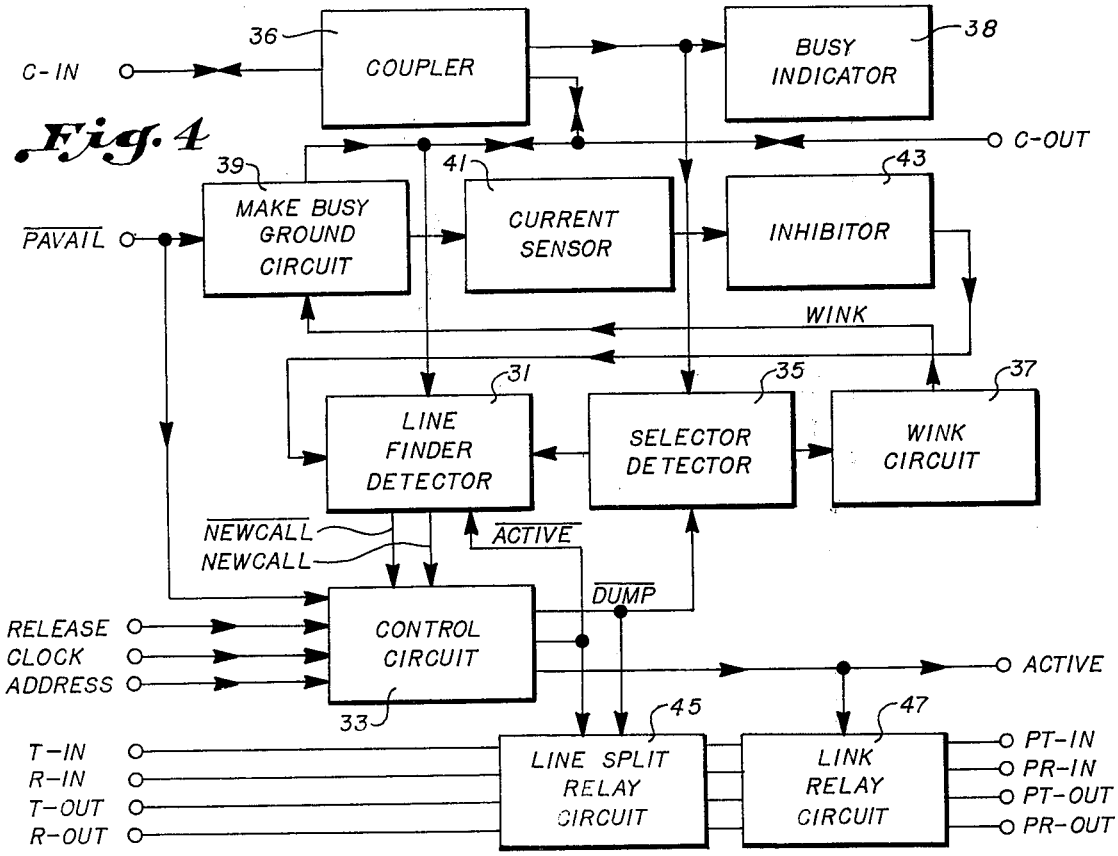
FIG. 4 is a block diagram of a link formed in accordance with the invention.
Figure 5:
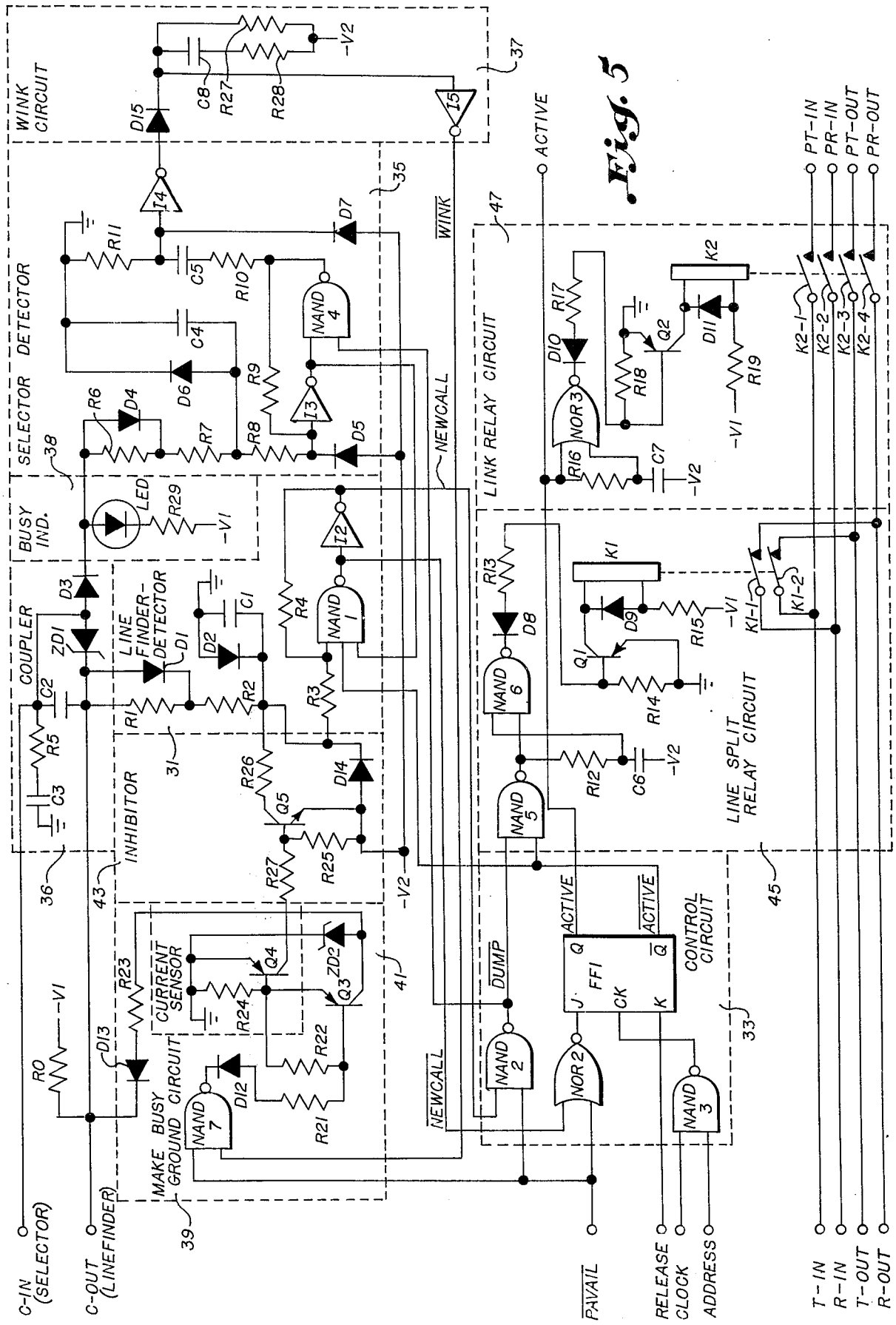
FIG. 5 is a schematic and logic diagram of a link formed in accordance with the invention.

FIG. 4 is a block diagram of a preferred embodiment of a link formed in accordance with the invention, and FIG. 5 is a schematic and logic diagram of the same embodiment. These figures include: a linefinder detector 31; a control circuit 33; a selector detector 35; a coupler 36; a wink circuit 37; a busy indicator 38; a make-busy ground circuit 39; a current sensor 41; and inhibitor 43; a line split relay circuit 45; and, a link relay circuit 47.

C-IN and C-OUT are connected to the coupler 36. The coupler is also connected to the busy indicator 38 and the selector detector 35. C-OUT is also connected to the make-busy ground circuit 39 and the linefinder detector 31.

The $\overline{\text{P AVAIL}}$ output of I1 is connected to the make-busy ground circuit 39 and to the control circuit 33. RELEASE, CLOCK and ADDRESS are connected to inputs of the control circuit 33. T-IN, R-IN, T-OUT and R-OUT are connected through the line split relay circuit 45 and the link relay circuit 47 to PT-IN, PR-IN, PT-OUT and PR-OUT, respectively, as most clearly illustrated in FIG. 5 and hereinafter described.

The control circuit generates the ACTIVE signal that, in addition to being applied to NOR 1, is also applied to the link relay circuit 47. The control circuit also generates a signal designated $\overline{\text{ACTIVE}}$, which is the complement of ACTIVE. $\overline{\text{ACTIVE}}$ is applied to the link relay circuit 45 and to the linefinder detector 31. Finally, the control circuit generates a signal designated $\overline{\text{DUMP}}$, which is applied to the line split relay circuit 45 and to the selector detector 35.

The make-busy ground circuit is also connected to the current sensor 41. The current sensor is connected by the inhibitor 43 to the linefinder detector 31. The selector detector is connected to the linefinder detector 31 and to the wink circuit 37. The wink circuit 37 generates a signal designated WINK and applies it to the make-busy ground circuit 39. The linefinder detector 31 generates two signals designated NEWCALL and $\overline{\text{NEWCALL}}$ and applies them to the control circuit 33. NEWCALL is the complement (opposite binary state) of $\overline{\text{NEWCALL}}$.

Prior to describing the operation of the link illustrated in FIG. 4, a brief description of two telephone system operation sequences is set forth, because the invention is useful with either sequence. In one sequence, when a customer or subscriber goes OFF HOOK, C-OUT is immediately grounded. The OFF HOOK telephone also creates a tip/ring loop, which draws current from a battery supply in the first selector. This loop current causes the first selector to return a ground potential via its C lead (C-IN). It is this sequence of operation that is used to assist in describing the operation of the present invention. In the second telephone sequence of operation, a C-OUT ground is not immediately created when a subscriber goes OFF HOOK. Rather, tip/ring loop current causes the first selector to return a ground (on C-IN) before the C-OUT ground occurs. The present invention compensates for this time delay by forming the selector detector in a manner such that it reacts slower than the linefinder detector, the time delay being adequate for the linefinder detector to react to a C-OUT ground before the selector detector reacts to a C-IN ground. The circuit illustrated in FIG. 5 and hereinafter described has a built in time delay that accomplishes this result.

Turning now to a description of the operation of the link illustrated in FIG. 4, assuming that the linefinder associated with the illustrated link is being pointed at when a related telephone goes OFF HOOK, C-OUT is grounded. Shortly thereafter the tip/ring loop current causes the first selector to return a ground via C-IN, i.e., C-IN is grounded. The C-OUT ground is detected by the linefinder detector and causes NEWCALL to achieve a binary one state. NEWCALL is generated by a C-OUT ground and the failure of the selector detector to create an output indicating that C-IN is at ground. At the same time that $\overline{\text{NEWCALL}}$ achieves a binary one state, NEWCALL achieves a binary zero state. Thus, the control circuit 33 is advised that the telephone has gone OFF HOOK.

When the link's CLOCK and ADDRESS inputs simultaneously achieve binary one states during the time multiplex cycle, a latch in the control circuit 33 latches, causing $\overline{\text{ACTIVE}}$ to achieve a binary one state and ACTIVE to achieve the complementary (binary zero) state. ACTIVE becoming a binary one causes $\overline{\text{P AVAIL}}$ to achieve a binary one state also. In addition, an ACTIVE binary one state causes the link relay circuit 47 to link T-IN, T-OUT, R-IN and R-OUT to PT-IN, PT-OUT, PR-IN and PR-OUT, respectively. The $\overline{\text{ACTIVE}}$ zero causes the line split relay circuit 45 to split the line between T-IN and R-IN, and T-OUT and R-OUT, respectively. In this manner, the tip and ring input and ouput leads are connected to the port tip and ring input and output leads, and then split. This connection allows the port to convey the telephone signals to an associated signal processing system in a conventional manner.

When signal processing is complete, the port causes RELEASE to achieve a binary one state. This state resets the latch of the control circuit 33 causing ACTIVE and $\overline{\text{ACTIVE}}$ to return to binary zero and one states, respectively. These states cause the line split relay circuit to first couple T-IN and R-IN to T-OUT and R-OUT, respectively, and then the line relay circuit to disconnect T-IN, R-IN, T-OUT and R-OUT from PT-IN, PR-IN, PT-OUT and PR-OUT, respectively. The ACTIVE binary zero also causes $\overline{\text{P AVAIL}}$ to return to a binary zero state.

The make-busy ground circuit 39 of each link common to a "seized" port establishes a false ground on its C-OUT terminal that, as previously discussed, informs their associated linefinders that the common port is not available. In this regard $\overline{\text{P AVAIL}}$ causes the make-busy ground circuits 39 to generate the false ground signal. The generation of the false ground signal by the make-busy ground circuit is sensed by the current sensor 41 and, through the inhibitor 43, prevents the linefinder detectors 31 of all links, other than the link that has seized the port, from generating NEWCALL and $\overline{\text{NEWCALL}}$.

It will be appreciated that several common port links could be carrying a conversation at the same time other links are indicating that the port is available. These latter links can seize the port, as needed, and allow the desired coupling to a signal processor to take place. In some instances, the port may be "seized" by one link when a conversation carried by another link terminates. It will be appreciated by those skilled in the art that it is desirable to immediately free the linefinder and first selector associated with the conversation terminated link. Obviously, such release action must take place without the seizing link being required to release the port. The wink circuit performs this function. Specifically, when the conversation terminates and the telephone goes ON HOOK, the selector detector 35 generates a signal that causes the wink circuit 37 to generate a wink signal. The wink signal (illustrated as $\overline{\text{WINK}}$) is basically a short time period binary zero level square wave that inhibits the make-busy ground circuit 39 of the conversation terminated link only for a short time period. The time period is adequate for the linefinder to release the subscriber's or customer's line before the false ground is returned to signify to the scanning switch that the linefinder is not available for subsequent use.

It is possible for two links connected to a common port to have their C-OUT terminals grounded at substantially the same point in time. Should this occur, the link whose address first turns up in the link time multiplexing sequence will seize the port. The other link, upon sensing that $\overline{\text{P AVAIL}}$ has achieved a binary one state will apply a false ground to its C-OUT terminal. In this case, however, the current sensor of the non-seizing link does not prevent the linefinder detector from generating NEWCALL; rather, it allows NEWCALL to remain in the binary one state caused by the initial simultaneously occurring OFF HOOK action of the two telephones. The control circuit 33, upon sensing the one state of $\overline{\text{P AVAIL}}$ and NEWCALL, generates a DUMP signal ($\overline{\text{DUMP}}$ goes to zero). The $\overline{\text{DUMP}}$ zero activates the line split relay circuit 45 to split the line. Splitting the line without creating a prior connection to the port prevents the first selector from creating a C-IN ground, whereupon the linefinder subsequently removes the C-OUT ground. This action, in turn, causes the NEWCALL and DUMP signals to return to zero. DUMP returning to one activates the wink circuit via the selector detector, briefly removing the false make-busy ground signal. The end result of this sequence of actions, which is more fully described below, causes the associated linefinder scanning switch to route the incoming call to another linefinder with a link whose associated port is available for signal processing.

FIG. 5 illustrates in more detail a link circuit formed in accordance with the invention. The linefinder detector 31 comprises: a capacitor designated C1; two diodes designated D1 and D2; a three-input NAND gate designated NAND 1; an inverter designated I2; and, four resistors designated R1 through R4. R1, R2 and R3 are connected in series between C-OUT and one input of NAND 1. The junction between R2 and R3 is connected to the cathode of D2. The anode of D2 is connected to ground. C1 is connected in parallel with D2. C-OUT is also connected to the anode of D1. The cathode of D1 is connected to the junction between R1 and R2. The output of NAND 1 is connected to the input of I2. The output of I2 is connected through R4 to the junction between R3 and its associated input of NAND 1. The output of NAND 1 is the signal designated $\overline{\text{NEWCALL}}$ and the output of I2 is the signal designated NEWCALL. These signals are applied to components of the control circuit hereinafter described. Also connected to C-OUT, through a resistor designated R0, is a voltage source designated $-\text{V1}$.

The control circuit 33 comprises: two two-input NAND gates designated NAND 2 and NAND 3; a two input NOR gate designated NOR 2; and, a JK flipflop designated FF1. NEWCALL is applied to one input of NAND 2 and $\overline{\text{NEWCALL}}$ is applied to one input of NOR 2. $\overline{\text{P AVAIL}}$ is applied to the second inputs of NAND 2 and NOR 2. NAND 3 receives the CLOCK and ADDRESS inputs previously described. The output of NAND 2 is the signal designated $\overline{\text{DUMP}}$. The output of NOR 2 is connected to the J input of FF1. The output of NAND 3 is connected to the CLOCK input of FF1. RELEASE is applied to the k input of FF1. The Q output of FF1 is the signal designated ACTIVE and the $\overline{\text{Q}}$ output of FF1 is its complement, $\overline{\text{ACTIVE}}$. $\overline{\text{ACTIVE}}$ is applied to the second input of NAND 1 of the linefinder detector.

The coupler 36 comprises: two capacitors designated C2 and C3; a diode designated D3; a zener diode designated ZD1 and a resistor designated R5. C-OUT is connected to the cathode of ZD1. The anodes of ZD1 and D3 are connected together and to C-IN. C2 is connected in parallel with ZD1. The junction between ZD1 and D3 is connected through R5 in series with C3 to ground.

The selector detector 35 comprises: six resistors designated R6-R11; four diodes D4-D7; two capacitors designated C4 and C5; two inverters designated I3 and I4; and, a two-input NAND gate designated NAND gate 4.

The cathode of D3 is connected through R6 in series with R7 and R8 to the cathode of D5. The anode of D5 is connected to a second voltage source designated $-\text{V2}$. The cathode of D3 is also connected to the anode of D4, and the cathode of D4 is connected to the junction between R6 and R7. The junction between R7 and R8 is connected to the anode of D6. The cathode of D6 is connected to ground; and, C4 is connected in parallel with D6. The cathode of D5 is also connected to the input of I3. The output of I3 is also connected to one input of NAND 1 (of the linefinder detector 31).

The output of NAND 4 is connected through R9 to the cathode of D5. Further, the output of NAND 4 is connected through R10 in series with C5 to the input of I4. The input of I4 is also connected through R11 to ground, and to the cathode of D7. The anodes of D7 and D5 are connected to $-\text{V2}$.

The line split relay circuit comprises: two two-input NAND gates designated NAND 5 and NAND 6; four resistors designated R12-R15; a capacitor designated C6; a PNP transistor designated Q1; two diodes designated D8 and D9; and, a relay having a coil designated K1 and two pair of normally closed contacts designated K1-1 and K1-2.

$\overline{\text{DUMP}}$ is applied to one input of NAND 5 and $\overline{\text{ACTIVE}}$ is applied to the second input of NAND 5. The output of NAND 5 is connected to one input of NAND 6 and through R12 in series with C6 to $-\text{V2}$. The junction between R12 and C6 is connected to the second input of NAND 6. The output of NAND 6 is connected to the cathode of D8. The anode of D8 is connected through R13 in series with R14 to ground. The junction between R13 and R14 is connected to the base of Q1. The emitter of Q1 is connected to ground. The collector of Q1 is connected to the cathode of D9. The anode of D9 is connected through R15 to $-\text{V1}$. K1 is connected in parallel with D9. K1-1 is connected between R-IN and R-OUT; and K1-2 is connected between T-IN and T-OUT.

The link relay circuit comprises: four resistors designated R16-R19; a capacitor designated C7; a two-input NOR gate designated NOR 3; two diodes designated D10 and D11; a PNP transistor designated Q2; and, a relay comprising a coil designated K2 and four normally open contacts designated K2-1, K2-2, K2-3 and K2-4.

ACTIVE is applied to one input of NOR 3 and through R16 in series with C7 to −V2. The junction between R16 and C7 is connected to the second input of NOR 3. The output of NOR 3 is connected to the cathode of D10. The anode of D10 is connected through R17 in series with R18 to ground. The junction between R17 and R18 is connected to the base of Q2. The emitter of Q2 is connected to ground. The collector of Q2 is connected to the cathode of D11. The anode of D11 is connected through R19 to −V1. K2 is connected in parallel with D11. K2-1 is connected between T-IN and PT-IN; K2-2 is connected between R-IN and PR-IN: K2-3 is connected between T-OUT and PT-OUT; and, K2-4 is connected between R-OUT and PR-OUT.

It will be appreciated from viewing FIG. 5 and the previous description that the line split relay circuit is quite similar to the link relay circuit. That is, ignoring NAND 5, the circuits are identical with the exception that one includes a NAND gate and the other includes a NOR gate. It will be appreciated that these gates, in combination with their input resistors and capacitors (which form time delay circuits) merely operate in opposite modes. In one case, the output of the gate shifts immediately upon the occurrence of the opposite input signal and in the other case, the output shifts after the capacitor voltage has achieved a suitable level state. The purpose of the circuits is to allow K1 and K2 to open and close their associated relay contacts in the right sequence. That is, as will be appreciated by those skilled in the art it is necessary to supply a substitute voltage to a telephone prior to its associated tip and ring lines being split, the line splitting function in this case being performed by K1-1 and K1-2 and the port supplying the substitute voltage. In order for this voltage to be supplied prior to line splitting, K2 must be activated to close its associated contacts before K1 is activated to open its associated contacts. In reverse (line restoring), it is necessary that K1 close its associated contacts prior to K2 opening its associated contacts. These sequences are controlled by NAND 6 and NOR 3, and their respective delay circuits. In this way, the oscillators of the associated telephone are always maintained energized and erroneous signals are not caused by the occurrence of step switching transients.

The make-busy ground circuit 30 comprises: a two-input NAND gate designated NAND 7; three resistors designated R21–R23; a PNP transistor designated Q3; two diodes designated D12 and D13; and, a zener diode designated ZD2. $\overline{P \text{ AVAIL}}$ is applied to one input of NAND 7. $\overline{WINK}$, generated by the wink circuit hereinafter described, is applied to the second input of NAND 7. The output of NAND 7 is connected to the cathode of D12. The anode of D12 is connected through R21 to the base of Q3. R22 is connected across the emitter-base terminals of Q3. The collector of Q3 if connected to the anode of ZD2 and, through R23 to the anode of D13. The cathode of D13 is connected to C-OUT.

The current sensor 41 comprises: a PNP transistor designated Q4; and, a resistor designated R24. The base of Q4 is connected to the emitter of Q3 and through R24 to ground. The emitter of Q4 is connected to ground and to the cathode of ZD2.

The inhibitor 43 comprises: a NPN transistor designated Q5; three resistors designated R25, R26 and R27; and, a diode designated D14. The collector of Q4 is connected, through R27, to the base of Q5. The base of Q5 is also connected through R25 to −V2. The collector Q5 is connected through R26 to the junction between R2 and R3 of the line finder detector 31. The emitter of Q5 is connected to −V2 and to the anode of D14. The cathode of D14 is connected to the junction between R2 and R3.

The wind circuit 37 comprises: a diode designated D15; two resistors designated R27 and R28; a capacitor designated C8; and, an inverter designated I5. The output of I4 of the selector detector 35 is connected to the anode of D15. The cathode of D15 is connected through R27 to −V2. The cathode of D15 is also connected to the input of I4 and through C8 in series with R28 to −V2. The output of I4 is the signal designated $\overline{WINK}$ and is applied to the second input of NAND 7 of the make-busy ground circuit 39.

The link illustrated in FIG. 5 operates in the manner setforth above with respect to FIG. 4. This operation is clearly illustrated in the FIGS. 6, 7 and 8 timing diagrams. Assume first that the link is quiescent, i.e., its associated port is available. When quiescent, C-OUT is at a binary zero state, C-IN is zero, NEWCALL is zero, $\overline{NEWCALL}$ is one, ACTIVE is zero, $\overline{ACTIVE}$ is one, $\overline{P \text{ AVAIL}}$ is zero, $\overline{WINK}$ is one and $\overline{DUMP}$ is one. Under this set of conditions, all of the inputs to NAND 1 are one, except for its C-OUT input (on R3).

Figure 6:
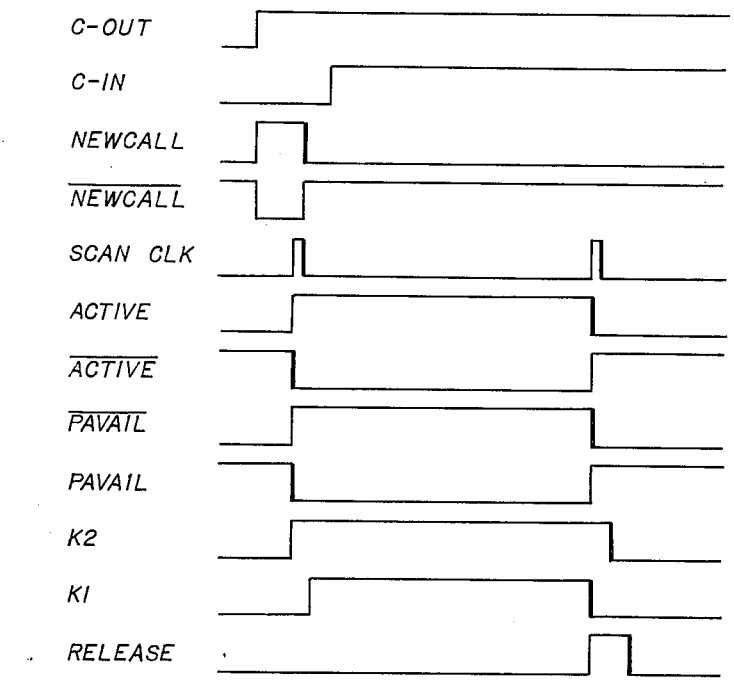
FIG. 6 is a timing diagram illustrating an attachment and release sequence of operation of a link formed in accordance with the invention.

Assuming that the associated linefinder's scanning switch is pointing at the illustrated link when a related telephone goes OFF HOOK, the grounding of C-OUT caused by the OFF HOOK state of the telephone causes the third input of NAND 1 to achieve a binary one state whereby $\overline{NEWCALL}$ changes to a binary zero state and NEWCALL becomes a one, see the third and fourth lines of FIG. 6. The next scan clock signal (combination of CLOCK and ADDRESS simultaneously achieving one states) clocks the now one output of NOR 2 into FF1 causing ACTIVE to achieve a one state and $\overline{ACTIVE}$ to achieve a zero state. $\overline{ACTIVE}$ achieving a zero state terminates NEWCALL, i.e., it returns to its zero state. The sensing of a C-IN ground by the selector detector after a short, built-in time delay causes its input to NAND 1 to prevent the generation of a second NEWCALL when signal processing is complete and $\overline{ACTIVE}$ returns to a binary one state. The setting or latching of FF1 also causes the line split and link relay circuits to operate in the manner described above whereby the port is connected to the input and output tip and ring lines, and those lines are split.

Signal processing now takes place. At the end of signal processing the port causes RELEASE to achieve a one state. The next scan clock clocks the one into FF1 causing it to reset, whereby ACTIVE returns to zero and $\overline{ACTIVE}$ returns to one. This reversal of ACTIVE and $\overline{ACTIVE}$ causes the line split and link relay circuits to disconnect the port and restore the tip and ring input and output connection.

As discussed above, during the period of time that one link is connected to a common port, the other links apply a false busy ground to their C-OUT terminals.

This action is accomplished by the $\overline{\text{P AVAIL}}$ one state causing the output of NAND 7 to achieve a zero state, $\overline{\text{WINK}}$ being in a one state. The zero output of NAND 7 turns Q3 on, grounding C-OUT through D13, R24, Q3 and R23. The current flow through Q3 switches Q4 on which, in turn, switches Q5 on. Turning Q5 on clamps the "C-OUT" input of NAND 1 to a binary zero level, preventing newcall from achieving a one state.

Figure 7:
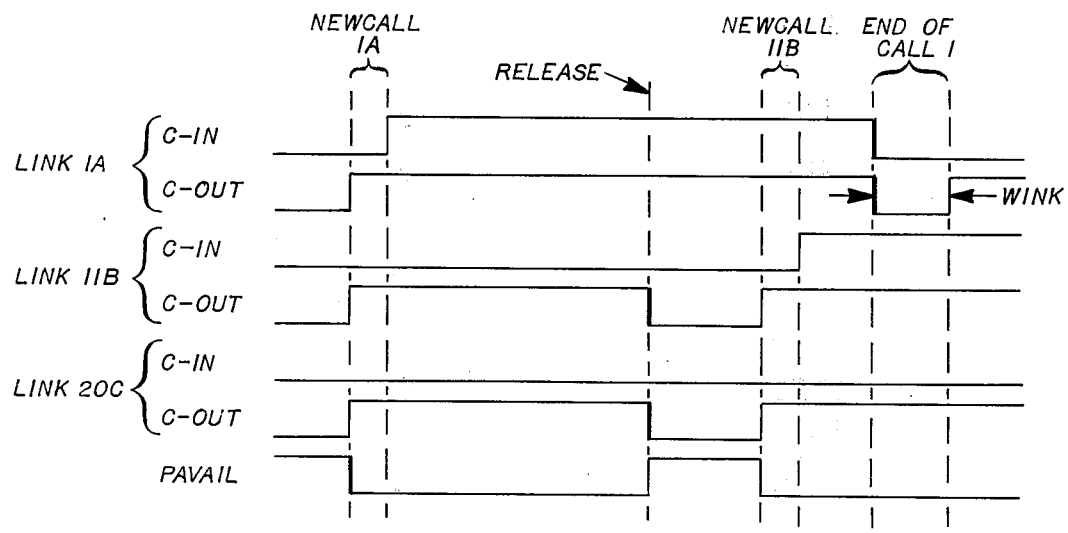
FIG. 7 is a timing diagram illustrating the wink aspect of the invention.
Figure 8:
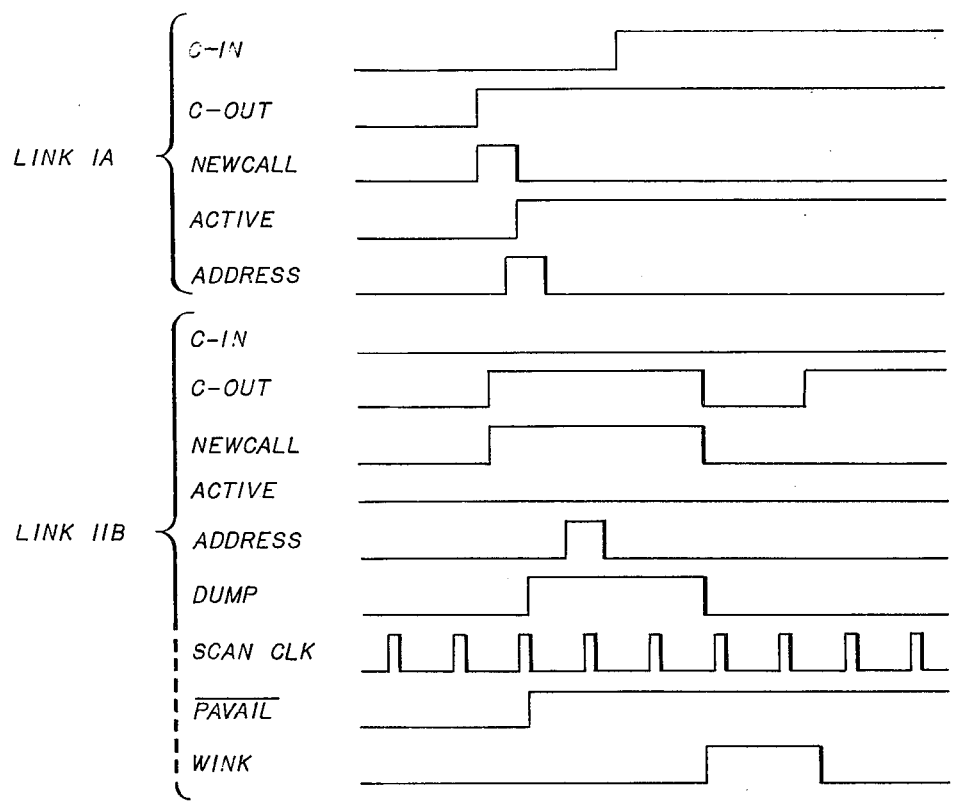
FIG. 8 is a timing diagram illustrating the dump aspect of the invention.

As also discussed above, the termination of a conversation carried by one link during the period of time that its make-busy ground circuit is adapted to generate a ground results in a WINK signal. The WINK signal allows its associated linefinder to be released. FIG. 7 illustrates WINK timing. When the conversation terminates, C-IN drops to a binary zero state. This condition is sensed by the selector detector, and causes the output of NAND 4 to place a zero on the input of I4. I4 thus places a one on the input of I5. This one causes the output of I5 to achieve a zero state, and thus, terminate the zero on the output of NAND 7 switching Q3 off and removing the ground from C-OUT, thereby allowing the associated linefinder to be released. The output of I4 stays in a zero state until the zero on C5 is discharged through R11 and the one on C8 is discharged through R27 to a zero level whereas the output of I4 returns to a one state and the output of NAND 7 returns to a zero state. Consequently, the time of the WINK pulse is determined by the values of R27, C8 and R28 and —V2. It is pointed out here that the values of —V2 and —V1 are different. In one actual embodiment of the invention, —V1 is equal to —48 volts, the voltage normally applied via a resistance to the oscillators of a touch tone-type telephone. In that same embodiment, —V2 is equal to —15 volts.

As previously indicated, $\overline{\text{DUMP}}$ goes to a zero state when $\overline{\text{P AVAIL}}$ and NEWCALL are in one states. This condition occurs when two links are both attempting to seize their common port at the same time and the other address has turned up first in the link address sequence. The second link continues to generate NEWCALL after the first link has seized the port because the C-OUT ground caused by its line finder prevents the false ground generated by its make-busy circuit from creating a current flow through Q3. Thus, Q4 doesn't sense a current flow and the inhibitor doesn't clamp the "C-OUT" input to a zero level, whereby NEWCALL remains in a one state. The control circuit, upon sensing the one states of $\overline{\text{P AVAIL}}$ and NEWCALL generates a DUMP signal ($\overline{\text{DUMP}}$ goes to zero). The zero state of $\overline{\text{DUMP}}$ activates the line split relay circuit by causing the output of NAND 5 to achieve a one state. Splitting the line without creating a prior connection to the port causes the link's linefinder to remove the ground from C-lead which action, in turn, causes NEWCALL and DUMP to return to zero states. The temporary switching of $\overline{\text{DUMP}}$ from a one state to a zero state also activates the wink circuit causing the false make-busy ground to be briefly removed. The end result of these actions is to cause the linefinder scanning switch to route the second incoming call to another linefinder with a link whose associated port is available for signal processing.

The busy indicator comprises: a light emitting diode designated LED and a resistor designated R29. The anode of LED is connected to the cathode of D3 of the coupler 36. The cathode of LED is connected through R29 to —V1. In operation, when the link is busy, current flows through LED causing it to emit light in a conventional manner.

It will be appreciated from the foregoing description of a preferred embodiment that the invention provides a port multiplexer suitable for use in telephone systems wherein telephone lines are connected to signal processing circuitry. Signal processing circuitry may take on a variety of forms, including a tone-to-pulse conversion system. The tone-to-pulse conversion system may be a dedicated system or an allotted system. In any event, the invention reduces the number of ports necessary for inclusion in an overall system. The invention does this in a manner such that actual port use time is increased (and, conversely, port idle time is reduced) over prior art systems. Yet, an adequate amount of port availability time remains, particularly if the connections between links and ports is chosen in a manner such that traffic is averaged over the entire number of ports available. Because the number of ports is reduced, the invention greatly decreases the overall port cost-per-use.

While a preferred embodiment of the invention has been illustrated and described, it will be appreciated by those skilled in the art and others that various changes can be made therein without departing from the spirit and scope of the invention. For example, other types of control circuits other than one including a JK flipflop latch can be utilized, if desired. In addition, gates other than NOR and NAND gates can be utilized. Further, other types of current sensors and related circuitry can be used, if desired. Hence, the invention can be practiced otherwise than as specifically described herein.

The embodiments of the invention in which an exclusive property or privilege is claimed are defined as follows:

1. A port multiplexer suitable for use in a telephone signal processing system to couple telephone lines to a signal processor comprising:
   at least one port suitable for converting telephone signals into a form suitable for receipt by a signal processor; and,
   a plurality of links, each suitable for connection between an associated linefinder and first selector of a telephone system, said plurality of links being connected to said at least one port for seizing said at least one port and selectively routing signals from their associated linefinders to said at least one port and from said at least one port to their associated first selectors, each of said plurality of links including make-busy means for creating a false busy signal when any of the other of said plurality of links seizes said at least one port and is selectively routing signals from its associated linefinder to said at least one port and from said at least one port to its associated first selector.

2. A port multiplexer as claimed in claim 1 wherein each of said links also includes:
   a coupler adapted to be connected to the C leads of the linefinder and first selector associated with said link;
   a linefinder detector connected to said coupler for detecting the creation of a ground on the C lead of the linefinder associated with said link;
   a control circuit connected to said linefinder detector for generating an output signal, said output signal containing information related to the detection of a ground on the C lead of said associated linefinder by said linefinder detector;

a line split circuit adapted to be connected between the tip and ring leads of said associated first selector and linefinder for connecting and disconnecting said tip and ring leads of said associated first selector and linefinder, said line split circuit being connected to said control circuit in a manner such that when said output signal contains information indicating the detection of a ground by said linefinder detector, said line split circuit disconnects said tip and ring leads of said associated linefinder and first selector; and, a link circuit adapted to be connected between said tip and ring leads of said associated linefinder and first selector and tip and ring input and output terminals of said at least one port, for connecting and disconnecting said tip and ring leads of said first selector and linefinder associated with said link to said tip and ring input and output terminals of said at least one port, said link circuit being connected to said control circuit in a manner such that when said output signal contains information indicating the detection of a ground by said linefinder detector, said link circuit connects said tip and ring lead of said associated linefinder and first selector to said tip and ring input and output terminals of said at least one port.

3. A port multiplexer as claimed in claim 2 wherein each of said link circuits also includes a selector detector connected to said coupler for sensing a ground on the C lead of said associated first selector and applying a signal to said linefinder detector in accordance therewith.

4. A port multiplexer as claimed in claim 3 wherein each of said link circuits also includes a wink circuit connected to said selector detector and to said make-busy means for temporarily terminating any false busy signal being created by said make-busy means when said selector detector senses the termination of a ground signal on the C lead of said associated first selector.

5. A port multiplexer as claimed in claim 4 wherein said make-busy means includes:
a make-busy ground circuit adapted to apply a false ground to the C lead of said associated linefinder;
a current sensor connected to said make-busy ground circuit for sensing when said make-busy ground circuit is applying a false ground to the C lead of said associated linefinder; and,
an inhibitor connected to said current sensor and to said linefinder detector for applying an inhibit signal to said linefinder detector that inhibits the operation of said line-finder detector when said false ground is being applied to the C lead of said associated linefinder.

6. A port multiplexer as claimed in claim 2 wherein said make-busy means includes:
a make-busy ground circuit adapted to apply a false ground to the C lead of said associated linefinder;
a current sensor connected to said make-busy ground circuit for sensing when said make-busy ground circuit is applying a false ground to the C lead of said associated linefinder; and,
an inhibitor connected to said current sensor and to said linefinder detector for applying an inhibit signal to said linefinder detector that inhibits the operation of said line-finder detector when said false ground is being applied to the C lead of said associated linefinder.

7. A port multiplexer as claimed in claim 5 wherein each of said links selectively connected to said at least one port generates an active binary signal when its selector detector detects a ground on the C lead of its associated first selector; and, including a gate, connected to receive the binary signals generated by each of said links, for generating a port-not-available binary signal when any of said links generates an active signal, said port-not-available binary signal being applied to all of said links so as to cause their make-busy ground circuits to generate false grounds.

8. A port multiplexer as claimed in claim 1 wherein each of said links selectively connected to said at least one port generates an active binary signal when it detects a ground on the C lead of its associated first selector; and, including a gate, connected to receive the binary signals generated by each of said links, for generating a port-not-available binary signal when any of said links generates an active signal, said port-not-available binary signal being applied to all of said links so as to cause their make-busy means to generate false busy signals.

9. A link suitable for connection between the C, tip and ring leads of an associated linefinder/first selector combination of a telephone system for routing signals between said combination and a port having tip and ring input and output terminals, said link comprising:
a coupler for sensing the grounding of the C leads of said associated linefinder/first selector combination;
a linefinder detector connected to said coupler for detecting when said coupler senses the grounding of the C lead of the linefinder of said associated linefinder/first selector combination;
a control circuit connected to said linefinder detector for generating binary control signals whose state is related to whether said linefinder detector is detecting that said coupler has sensed the grounding of the C lead of the linefinder of said associated linefinder/first selector combination;
a line split circuit connected to said control circuit for receiving a binary control signal from said control circuit and for splitting the tip and ring connection between said line-finder and said first selector of said associated linefinder/first selector combination when said binary control signal is in a predetermined state; and,
a link circuit connected to said control circuit for receiving a binary control signal from said control circuit and for connecting the tip and ring leads of said linefinder and first selector of said linefinder/first selector combination to the tip and ring input and output terminals of said port when said binary control signal is in a predetermined state.

10. A link as claimed in claim 9 including a make-busy circuit adapted to apply a false ground to said associated linefinder/first selector combination upon receipt of an external control signal.

11. A link as claimed in claim 10 also including a selector detector connected to said coupler for sensing the grounding of the C lead of the first selector of said associated linefinder/first selector combination and applying a signal to said linefinder detector in accordance therewith.

12. A link as claimed in claim 11 also including a wink circuit connected to said selector detector and to said make-busy circuit for temporarily terminating said false ground created by said make-busy circuit when said selector detector senses the termination of a ground signal on the C lead of the first selector of said associated linefinder/first selector combination.

13. A link as claimed in claim 12 wherein said make-busy circuit includes:
- a make-busy ground circuit adapted to apply a false ground to the C lead of the linefinder of said associated linefinder/first selector combination;
- a current sensor connected to said make-busy ground circuit for sensing when said make-busy ground circuit is applying a false ground to the C lead of the linefinder of said associated linefinder/first selector combination; and,
- an inhibitor connected to said current sensor and to said linefinder detector for applying an inhibit signal to said linefinder detector that inhibits the operation of said line-finder detector when said false ground is being applied to the C lead of the linefinder of said associated linefinder/first selector combination.

14. A link as claimed in claim 10 wherein said make-busy circuit includes:
- a make-busy ground circuit adapted to apply a false ground to the C lead of the linefinder of said associated linefinder/first selector combination;
- a current sensor connected to said make-busy ground circuit for sensing when said make-busy ground circuit is applying a false ground to the C lead of the linefinder of said associated linefinder/first selector combination; and,
- an inhibitor connected to said current sensor and to said linefinder detector for applying an inhibit signal to said linefinder detector that inhibits the operation of said line-finder detector when said false ground is being applied to the C lead of the linefinder of said associated linefinder/first selector combination.

* * * * *